United States Patent [19]

Sherman

[11] 4,283,215

[45] Aug. 11, 1981

[54] TWO-PIECE BOTTOM PLATE FOR MAKING CROWN BOTTOM GLASSWARE ON THE HE-28 MACHINES

[75] Inventor: James E. Sherman, Temperance, Mich.

[73] Assignee: Owens-Illinois Inc., Toledo, Ohio

[21] Appl. No.: 862,270

[22] Filed: Dec. 20, 1977

[51] Int. Cl.³ .................... C03B 9/197; C03B 9/335
[52] U.S. Cl. .......................................... 65/79; 65/242; 264/531; 425/522
[58] Field of Search .......................... 65/79, 242, 77; 264/531, 534; 425/522

[56] References Cited

U.S. PATENT DOCUMENTS

| 1,972,717 | 9/1934 | Schutz | 65/242 X |
| 3,130,030 | 4/1964 | Watson et al. | 65/79 |
| 3,184,298 | 5/1965 | Van Zonneveld | 65/79 X |
| 3,792,988 | 2/1974 | Nowak et al. | 65/79 |

FOREIGN PATENT DOCUMENTS 411170 3/1925 Fed. Rep. of Germany ............ 65/242

*Primary Examiner*—Richard V. Fisher

*Attorney, Agent, or Firm*—Harold F. Mensing; Myron E. Click; D. H. Wilson, Jr.

[57] ABSTRACT

A mold assembly and method for automatically making crown bottom blown glassware wherein a charge of molten glass is shaped into a hollow preform in a parison mold by means of a plunger. The hollow preform or parison is removed from the parison mold and placed in a finishing mold having a bottom forming assembly comprised of an annular member slidably contained in the bottom end of the finish mold and a domed central member slidably mounted in the annular member such that it can be reciprocated from a normally retracted position level with or slightly below the top surface of the annular member to a position above that surface. The hollow preform is allowed to sag into partial contact with the surfaces of both the retracted domed member and the annular member at which time the central member is advanced upwardly in the annular member so its domed position is above the top surface of the annular member, and then both plate members are advanced upwardly into full contact with the preform while the preform is blown into its finished shape.

7 Claims, 6 Drawing Figures

TWO-PIECE BOTTOM PLATE FOR MAKING CROWN BOTTOM GLASSWARE ON THE HE-28 MACHINES

BACKGROUND OF THE INVENTION

This invention relates in general to blown glassware such as drinking tumblers and stemware having a concave bottom surface. More specifically, it relates to crown bottom glassware of the type which requires a hollow parison having a thick or massive bottom section that is allowed to sag into a finish mold where it is blown into its final shape.

Normally such glassware is produced on automatic forming machines wherein the parison is rotated as it is allowed to sag into its respective paste mold and onto a crowned bottom plate in the mold.

A major problem in forming this type of glassware, particularly thick bottomed tumblers known as sham-bottomed tumblers, is that the heavy lower end of the parison frequently settles on the bottom plate slightly off-center. The crowned or convex surface of the bottom plate tends to worsen any off-center condition as does the rotation of the parison in the mold. As a result, there is an uneven distribution of glass in the bottom of the finished tumbler, and its internal bottom surface is lopsided. It is an object of this invention to provide a method and means for producing crowned bottom glassware with a symmetrical distribution of glass in the bottom region of the finished tumbler.

SUMMARY OF THE INVENTION

The method and means for shaping the lower end of a glass parison on a crowned bottom plate assembly of a mold involve the use of a two-piece bottom plate having a central bottom surface forming member slidably contained in an annular outer bottom surface forming member. These members are reciprocable with respect to each other and with respect to the sidewall mold members of a clamshell-type mold. The inner bottom plate member has a convex parison engaging top surface, and the outer annular plate member has a planar horizontal top surface. The two bottom plate members are fitted together such that the inner member may be retracted to a first position whereat the highest point of its top surface is level with or slightly below the top surface of the annular member and then returned to second position whereat its peripheral edges are flush with the adjoining edges of the annular member.

The method involves the steps of forming a charge of molten glass into a hollow heavy-based parison, transferring the parison to a finish mold closed at the bottom by the two-piece bottom plate, rotating the parison relative to the finish mold, allowing the parison to sag into partial contact with the central and the annular bottom plate members, advancing the central plate member vertically upward to a position whereat its peripheral surface is flush with the adjoining edge of the annular member, maintaining the aforementioned relative position between the plate members while advancing them vertically in unison, blowing the hollow portion of the parison into contact with the body of the mold, retracting the central bottom plate member to a position level with or below the top of the annular plate member, and removing the formed glassware from the mold.

DETAILED DESCRIPTION OF THE INVENTION

Figure 1:
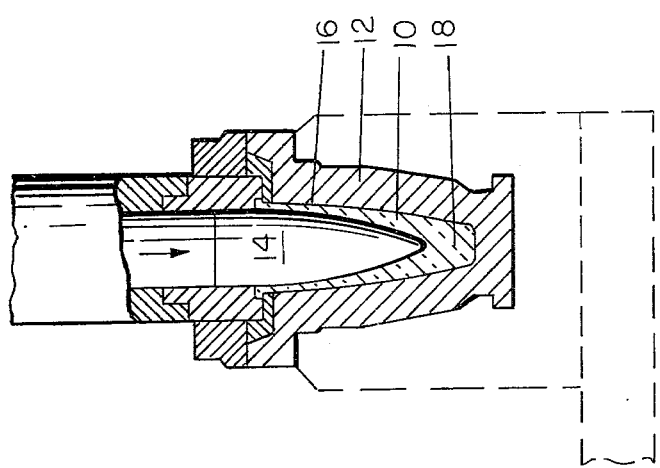
FIG. 1 is a cross-sectional view of a pressed parison and its forming apparatus.

Referring to the drawings, FIG. 1 shows a charge of molten glass that has been press-formed into a parison 10 in a parison mold 12 by means of a plunger 14. The parison 10 has a hollow upper portion 16 and a solid, relatively heavy, lower portion 18. For the purposes of this invention, it is not essential that the parison be formed by pressing it to its initial shape in a parison mold. It applies equally well to hollow, heavy based parisons formed pneumatically by injecting air under pressure into a charge of glass. After the initial forming step, the parison mold is removed from the molten glass parison, and the parison is rotated about its vertical axis and allowed to sag as it is being embraced by a finished mold (see FIG. 2). A two-piece bottom plate assembly 20 located in the lower end of the finishing mold 22 catches the bottom end of the sagging parison.

Preferably, the two-piece bottom plate assembly 20 comprises a central member 24 having a domed top surface 26 for contacting the parison and forming a generally concave crown bottom 27 on the underside of the finished article 28. An annular member 29, having a flat, horizontal surface 30, surrounds the central member 24 and forms a peripheral portion 31 of the bottom of the finished article which in this instance is a sham-bottomed tumbler 28. The ratio of the glass contacting top surface areas of the central and annular members is between 1:0.5 and 1:3.

The dome or convex top surface 26 of the central member merges with a short cylindrical body section 32 which slidably fits within a corresponding cylindrical surface 33 of the surrounding annular member 29. At the bottom end of this body section 32 is a larger diameter annular abutment flange 34 which limits the relative upward travel of the central member in the annular member. An integral push rod member 36 preferably of rectangular cross-section depends perpendicularly from the center of the central member.

The outer annular member 29 has a cylindrical outer surface 38 sized for a slip fit in the bottom of a clamshell-type glassware paste mold 22. Its internal surface has two concentric bore sections, the top one 33 of which is sized to slidably contain the body section 32 of the central member 24, and the bottom one 42 of which is sized to slidably contain the aforementioned abutment flange 34. The axial lengths of the cooperating cylindrical body section 32 of the central member and the top cylindrical bore section 33 of the annular member are such that the convex central member can be axially moved from a position where the peripheral edge of its domed surface 26 is flush with the horizontal top surface of the surrounding annular member 29 to a retracted pocket-forming position below the top of the annular member. In the retracted position, the highest point, i.e. the center point of the domed surface 26, is flush with or slightly below, e.g. 1/16" below, the plane of the horizontal surface 30 of the annular member 29.

Figure 5:
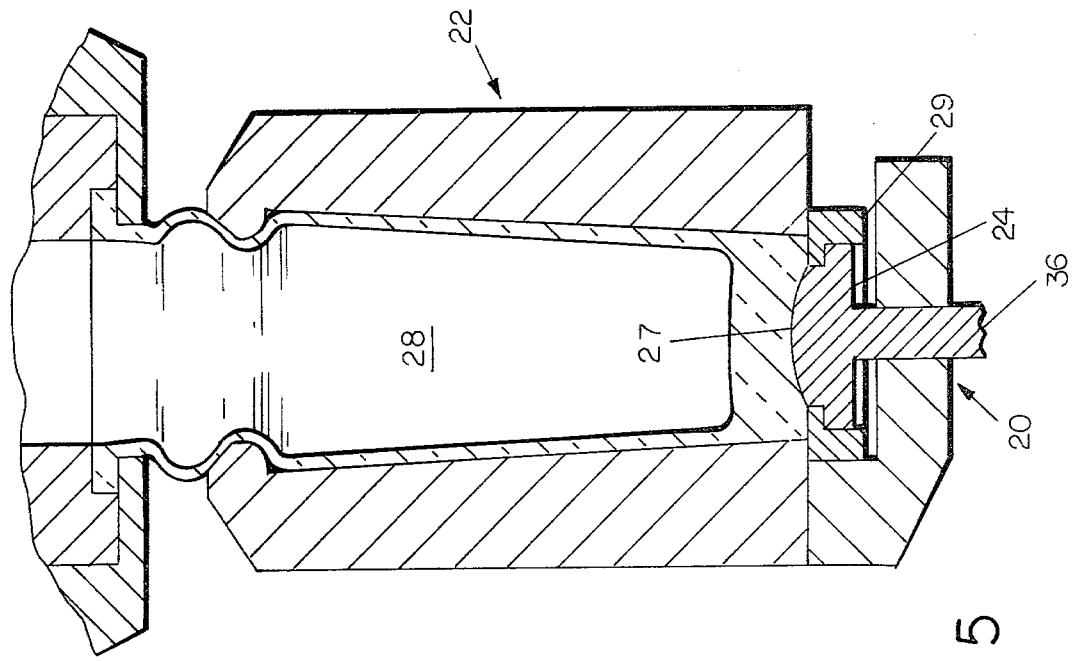

A cam (not shown) operating on the push rod 36 may be used to cycle the central member between the two positions. The cam may be contoured so as to continue the upward movement of the central member after it has reached its maximum relative upward position in the annular member, and thus cause both the central and annular members to be raised in unison to a position in the finishing mold 22 whereat the top surface of the annular member 29 abuts the bottom end 43 of the sidewall section 44 (see FIG. 5).

Figure 2:
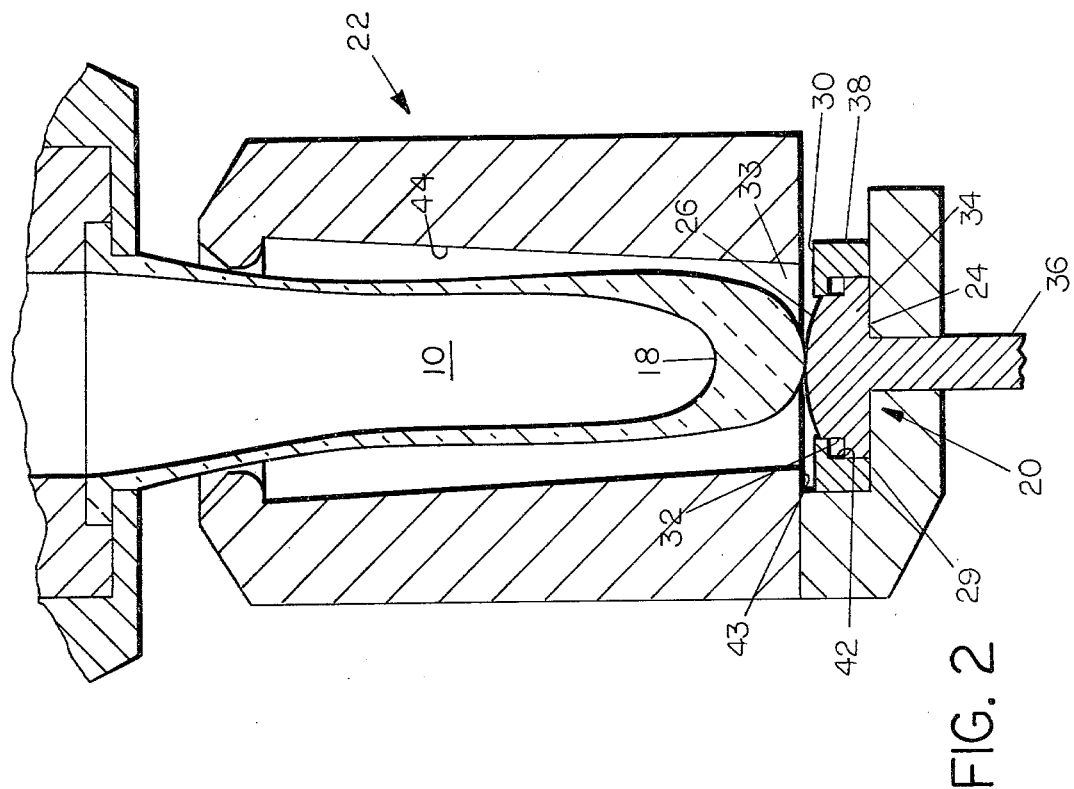
FIGS. 2-6 are sectional views of a clamshell-type glass mold with the two-piece bottom plate assembly of this invention illustrating progressive shape of the parison and the relative positions of the mold members during the various forming stages.
Figure 4:
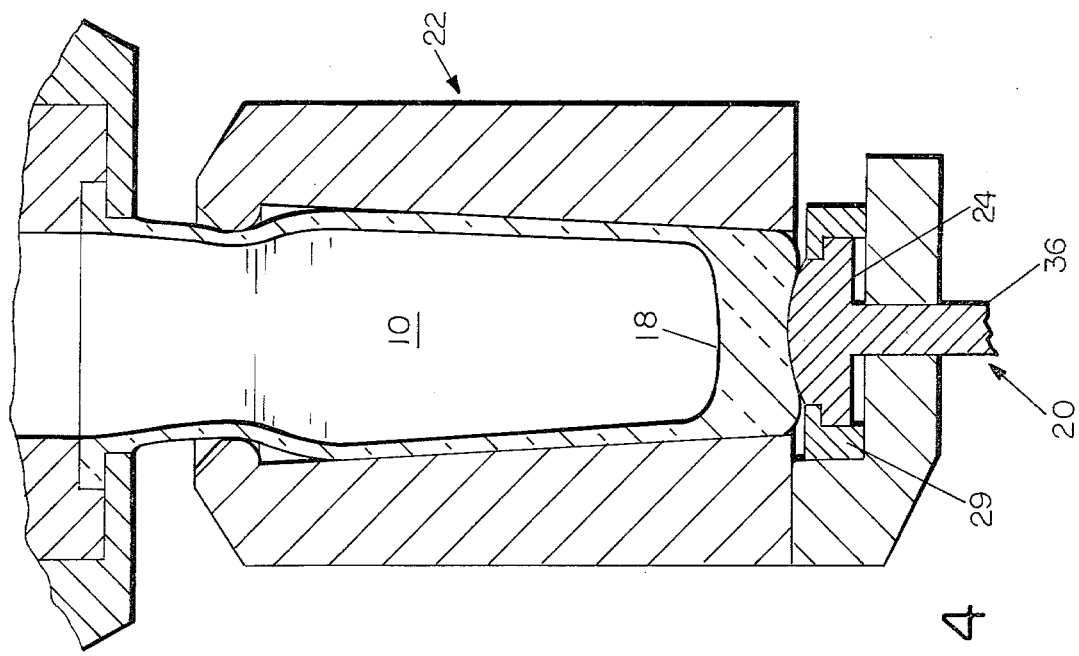
Figure 3:
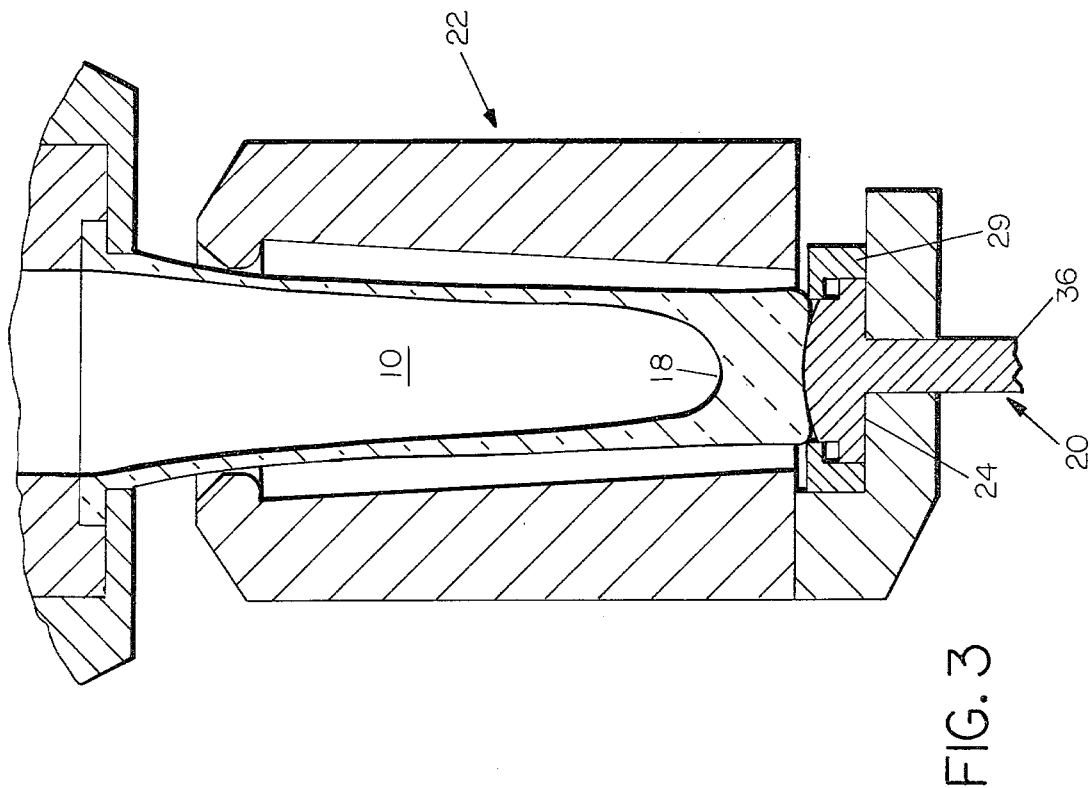
Figure 6:
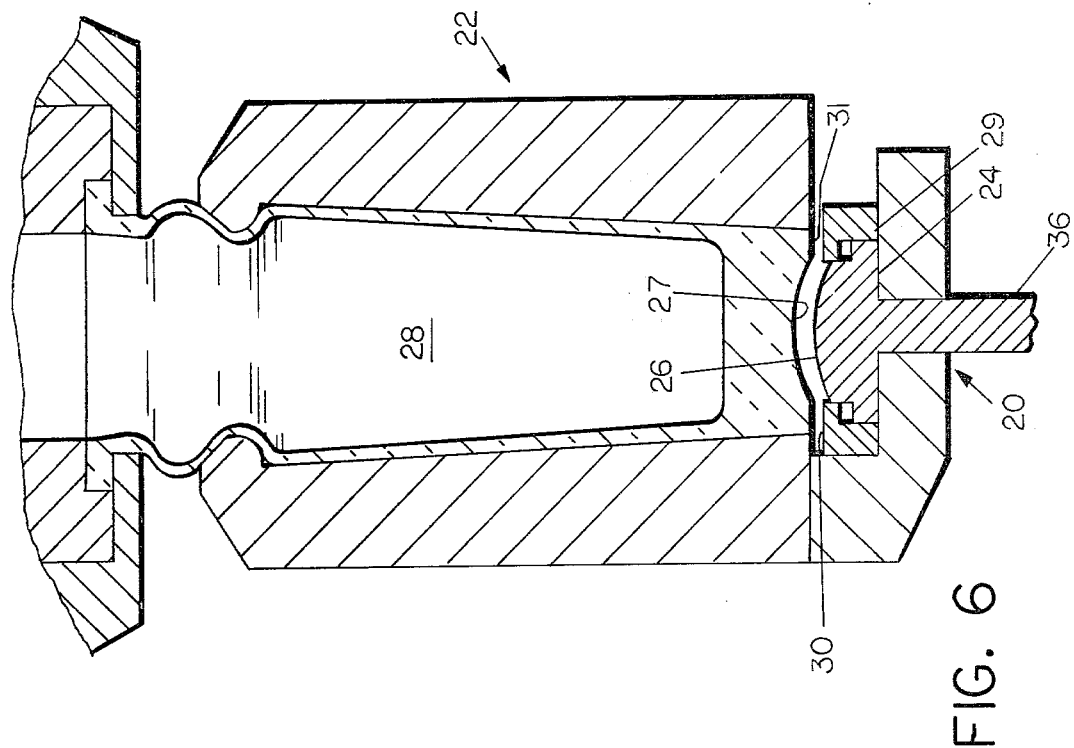

In operation, a hollow parison with a solid, relatively heavy bottom section is formed from a charge of molten glass. The parison is rotated on a blow-head and allowed to sag as it is enclosed in a clamshell-type glassware paste mold having a two-piece bottom plate assembly as described hereinbefore. Prior to being contacted by the lower end of the sagging parison, the domed central member of the two-piece bottom plate is retracted to a position whereat its highest point is level with or slightly below the top of the adjacent inner circumferential top edge of the surrounding annular member as shown in FIGS. 2 and 6. As the lower end of the molten glass parison sags into contact with the center of the convex surface and spreads laterally over part but not all of the convex surface and ultimately onto the inner edge of the horizontal surface of the annular member as shown in FIG. 3, the central member is advanced upwardly until the peripheral edge of its dome is flush with the adjacent inner circumferential edge of the annular member of the bottom plate assembly as shown in FIG. 4 while the first stage of blowing the hollow parison into its finished shape is being carried out. As the blowing process is continued into its final stage (see FIG. 5), the advancement of the domed central member 24 is also continued until it picks up the annular member 29 and moves it in unison into abutment with the bottom surface of the sidewall forming portion of the mold 22, thus forming the concave bottom surface 27 in the heavy base portion of the tumbler or article 28. This completes the forming process and the two-piece bottom plate assembly is returned to its retracted position as shown in FIG. 6 so the tumbler can be removed from the mold without scuffing its bottom surface.

By withdrawing the domed portion of the central member into the bore of the annular member so as to form an annular pocket, any molten glass that falls to the side of the center of the dome or slides off the dome is constrained by the top corner of the annular member rather than being allowed to flow laterally unrestrained.

This invention has been described and illustrated with respect to a preferred embodiment, but it is to be understood that modifications may be made without departing from the scope of the invention as defined in the following claims.

I claim:

1. A paste mold assembly for a drinking glass comprising: mold members defining the glass sidewall forming portions of said mold assembly, a bottom plate assembly in said mold assembly adjacent to the lower end of said sidewall forming portions, said bottom plate assembly including an annular outer member having a concentric cylindrical outer surface, said surface having a diameter sized to slidably fit in a paste mold assembly, a cylindrical bore at the top portion of said annular member, a cylindrical counterbore at the bottom portion thereof, a flat annular top surface having an inner annular glass contacting surface and an outer annular mold abutting surface, and a hat-shaped inner member having a domed top surface, a cylindrical body portion sized to be slidably contained in the bore of said outer member, an enlarged cylindrical base portion sized to slidably fit in said counterbore of said outer member and a coaxially aligned shaft portion depending from said base portion and integrally affixed thereto.

2. A paste mold assembly according to claim 1 further including cooperating abutment means on said bottom plate assembly members whereby said annular outer member is moved vertically upward by the continued upward movement of said inner member.

3. A paste mold assembly according to claim 2 wherein said abutment means stops the relative upward movement of said inner member in said annular outer member when the periphery of said domed surface is level with the adjacent surrounding flat top surface portion of said outer annular member.

4. A paste mold assembly according to claim 3 wherein said abutment means causes said inner and outer members to be advanced vertically upward in unison by continued upward advancement of said inner member to bring a portion of said flat top surface of said annular outer member into contact with said mold members.

5. A method of forming blown drinking glasses having a crowned bottom comprising the steps of: forming a hollow molten glass parison having a thick bottom section, placing the parison in a paste mold having a two-piece bottom plate assembly, rotating the parison about a vertical axis while allowing it to sag into partial contact with the glass contacting surfaces of a domed central member and a surrounding annular member of said bottom plate assembly while said domed member is in a retracted position relative to said annular member, advancing said domed member vertically so as to bring its glass contacting surfaces into full contact with said parison, engaging an abutment on said annular member with a corresponding abutment on said central member, advancing both of said bottom plate members upwardly in unison, thereby bringing the glass contacting surfaces of said annular member into full contact with said parison, blowing the hollow parison into its finished shape during the advancement of said domed member, lowering the bottom plate assembly and removing the blown drinking glass.

6. A method according to claim 5 wherein said domed member is retracted relative to said annular member prior to being contacted by the sagging parison such that at least a portion of the dome of the central member lies below the level of the glass contacting surface of the annular member.

7. A method according to claim 6 wherein the highest point of the dome lies below said level.

* * * * *